(12) United States Patent
Jang

(10) Patent No.: US 7,186,474 B2
(45) Date of Patent: Mar. 6, 2007

(54) NANOCOMPOSITE COMPOSITIONS FOR HYDROGEN STORAGE AND METHODS FOR SUPPLYING HYDROGEN TO FUEL CELLS

(75) Inventor: Bor Z. Jang, Fargo, ND (US)

(73) Assignee: Nanotek Instruments, Inc., Centerville, OH (US)

(*) Notice: Subject to any disclaimer, the term of this patent is extended or adjusted under 35 U.S.C. 154(b) by 459 days.

(21) Appl. No.: 10/910,521

(22) Filed: Aug. 3, 2004

(65) Prior Publication Data

US 2006/0030483 A1    Feb. 9, 2006

(51) Int. Cl.
*H01M 8/06* (2006.01)
(52) U.S. Cl. ............. 429/17; 423/648.1; 206/0.6; 977/779; 977/780; 977/962; 428/402.24; 428/34.1
(58) Field of Classification Search ............... 96/108, 96/154; 423/248, 648.1; 206/0.6, 0.7; 977/778, 977/779, 780, 962; 429/12, 17; 428/402.24, 428/34.1, 34.4
See application file for complete search history.

(56) References Cited

U.S. PATENT DOCUMENTS

| | | | |
|---|---|---|---|
| 4,211,537 A | 7/1980 | Teitel | |
| 4,302,217 A | 11/1981 | Teitel | |
| 4,594,363 A | 6/1986 | Blankenship et al. | |
| 5,077,320 A | 12/1991 | Touda et al. | |
| 5,653,951 A | 8/1997 | Rodriguez et al. | |
| 6,159,538 A | 12/2000 | Rodriquez et al. | |
| 6,720,007 B2 | 4/2004 | Walt et al. | |
| 6,759,463 B2 | 7/2004 | Lorah et al. | |
| 2002/0086908 A1* | 7/2002 | Chou et al. | 516/98 |
| 2006/0026900 A1* | 2/2006 | Jang | 48/190 |
| 2006/0063003 A1* | 3/2006 | Yang et al. | 428/403 |

OTHER PUBLICATIONS

A. C. Dillon, et al., "Storage of Hydrogen in Single-Walled Carbon Nanotubes," Nature, vol. 386, Mar. 1997, pp. 377-379.
A. Chambers, et al., "Hydrogen Storage in Graphite Nanofibers," The Journal of Physical Chemistry, B. vol. 102, No. 22, May 1998, pp. 4253-4256.
R. Chahine, et al., "Low-Pressure Adsorption Storage of Hydrogen," International Journal of Hydrogen Energy, Vo.19, No. 2, 1994, pp. 161-164.
S. Hynek, et al., "Hydrogen Storage by Carbon Sorption," International Journal of Hydrogen Energy, Vo.22, No. 6, 1997, pp. 601-610.

* cited by examiner

*Primary Examiner*—Frank M. Lawrence

(57) ABSTRACT

A core-shell composition for gas storage, comprising a hollow or porous core and a shell comprising a nanocomposite. The nanocomposite is composed of an exfoliated layered filler dispersed in a matrix material, which provides high mechanical strength to hold a high pressure gas such as hydrogen and high resistance to gas permeation. Alternatively, the porous core may contain a plurality of cavities selected from the group consisting of shell-hollow core micro-spheres, shell-porous core micro-spheres, and combinations thereof. These core-shell compositions, each capable of containing a great amount of hydrogen gas, can be used to store and feed hydrogen to fuel cells that supply electricity to apparatus such as portable electronic devices, automobiles, and unmanned aerial vehicles where mass is a major concern. A related method of storing and releasing hydrogen gas in or out of a plurality of core-shell compositions is also disclosed.

24 Claims, 6 Drawing Sheets

3(a)

3(b)

NANOCOMPOSITE COMPOSITIONS FOR HYDROGEN STORAGE AND METHODS FOR SUPPLYING HYDROGEN TO FUEL CELLS

FIELD OF THE INVENTION

The present invention is related to nanocomposite-based hydrogen storage material compositions and their uses as a fuel source that feeds hydrogen into a power-generating device such as a fuel cell or a hydrogen combustion engine.

BACKGROUND OF THE INVENTION

A major drawback in the utilization of hydrogen-based fuel cells for powering vehicles is the lack of an acceptable lightweight and safe hydrogen storage medium. Four conventional approaches to hydrogen storage are currently in use: (a) liquid hydrogen, (b) compressed gas, (c) cryo-adsorption, and (d) metal hydride storage systems. A brief description of these existing approaches is given below:

(a) The liquid hydrogen storage approach offers good solutions in terms of technology maturity and economy, for both mobile storage and large-volume storage systems with volumes ranging from 100 liters to 5000 m$^3$. However, the containers (dewar) for storing the liquefied hydrogen are made of very expensive super-insulating materials.

(b) The compressed gas storage approach is usually applied in underground supply systems, similar to a network of natural gas pipelines. This is an economical and simple approach, but it is unsafe and not portable. Compressed hydrogen gas in a large steel tank could be an explosion hazard.

(c) The cryo-adsorbing storage approach involves moderate weight and volume. In this approach, hydrogen molecules are bound to the sorbent only by physical adsorption forces, and remain in the gaseous state. The adsorbing temperature is in the range of 60 to 100° K. Activated carbon is commonly used as the sorbent due to its large number of small pores serving as hydrogen storage sites. The efficiency of $H_2$ uptake is no more than 7 wt %, which is equivalent to about 20 kg $H_2$ per cubic meter of activated carbon. The disadvantages of this approach are related to the low capacity and the cryogenic temperature required, which makes it necessary to use expensive super-insulated containers. The following two papers are directly related to this subject: (1) R. Chahine and T. K. Bose, "Low-pressure adsorption storage of hydrogen," International J. of Hydrogen Energy, 19-2 (1994) 161–164; (2) H. Hynek, et al., "Hydrogen storage by carbon sorption," International J. of Hydrogen Energy, 22-6 (1997) 601–610.

(d) The metal hydrides can store large quantities of $H_2$ via a chemical reaction of $H+M \rightleftharpoons M-H$, wherein M is a selected metal element. Two major metal systems, i.e. Fe—Ti and Mg—Ni, have been applied as hydrogen storage media and have been put into use in automobiles driven by a $H_2/O_2$ fuel cell. The operating temperature is 40–70° C. for the Ti—Fe system and 250–350° C. for the Mg—Ni system. The hydrogen storage capacity is less than 5 wt % for Ni—Mg and 2 wt % for Fe—Ti, which corresponds to less than 70 kg $H_2$ per m$^3$ of metals. Furthermore, metal hydride systems normally require 20–40 bar pressure to keep the hydrogen in equilibrium. This renders the container for the metal hydride too heavy and expensive, and limits the practical exploitation of these systems for portable electronic and mobility applications.

More recently, researchers have expressed great interest in storing $H_2$ in nanostructured carbon materials. For instance, Dillon, et al. ("Storage of hydrogen in single-walled carbon nanotubes," Nature, 386 (1997) 377–379) reported that about 0.01 wt % of $H_2$ was absorbed by raw carbon nanotube material (which was estimated to contain approximately 5 wt % of the single wall nanotube, SWNT) at 130° K. Chambers, et al. ("Hydrogen storage in graphite nanofibers," J. Phys. Chem., 102 (22) (1998) 4253–4256; U.S. Pat. No. 5,653,951 (Aug. 5, 1997) and U.S. Pat. No. 6,159,538 (Dec. 12, 2000)) claimed that tubular, platelet, and herringbone-like carbon nano-fibers (CNF) were capable of adsorbing in excess of 11, 45, and 67 weight % of $H_2$, respectively, at room temperature and at a pressure of 12 MPa. However, there has been no independent confirmation of these unusually high figures.

The above review indicates that the hydrogen storage technology still has four major barriers to overcome: (1) low $H_2$ storage capacity, (2) difficulty in storing and releasing $H_2$ (normally requiring a high T and/or high P), (3) high costs, and (4) potential explosion danger. A need exists for the development of a new high-capacity medium that can safely store and release hydrogen at near ambient temperature conditions. If high pressures are involved in storing hydrogen, the conditions must still be safe.

Teitel ("Hydrogen supply method," U.S. Pat. No. 4,211,537 (Jul. 8, 1980); "Hydrogen supply system," U.S. Pat. No. 4,302,217 (Nov. 24, 1981)) proposed an interesting system for supplying hydrogen to an apparatus (e.g., a combustion engine). This system contains a metal hydride-based hydrogen supply component and a micro cavity-based hydrogen storage-supply component which in tandem supply hydrogen for the apparatus. The metal hydride-based component includes a first storage tank filled with a metal hydride material which, when heated, decomposes to become a metal and hydrogen gas. When cooled, the metal will absorb hydrogen to refuel the component (via the re-formation of metal hydride). This first storage tank is equipped with a heat exchanger for both adding heat to and extracting heat from the material to regulate the absorption/desorption of hydrogen from the material. The micro cavity-based component includes a second tank containing individual micro cavities that contain or "encapsulate" hydrogen molecules held therein under high pressure. The hydrogen is released from the micro cavities by heating the cavities. This heating is accomplished by including a heating element within the micro cavity-containing tank. The metal hydride-based component supplies hydrogen for short term hydrogen utilization needs such as peak loading or acceleration. The micro cavity component supplies an overall constant demand for hydrogen and is also used to regenerate or refuel the metal hydride component.

The micro cavity storage component consists of a large plurality of micro cavities filled with hydrogen gas at pressures up to 10,000 psi (689.5 MPa or 680.3 atm). The micro cavities generally are micro-spheres with a diameter from about 5 to about 500 microns. The walls of the micro cavities are generally from about 0.01 to about 0.1 that of the diameter of the micro cavities. The filled micro-spheres may be moved from operation to operation like a fine sand or suspended in a gas or fluid for transportation. Hollow micro-spheres can be made of plastic, carbon, metal, glasses or ceramics depending upon the performance characteristics desired. Teitel suggested the preferred micro-spheres to be made of silicate glasses. Under refueling conditions (e.g., under high hydrogen pressures and elevated temperatures) hydrogen will diffuse into the micro cavities. When stored at normal temperatures and under atmospheric pressure the hydrogen remains inside the micro cavity under high pressure. Upon reheating the micro cavity, the hydrogen is caused to diffuse outside the cavity and is available for utilization by the apparatus.

Advantages of the Teitel System: The present inventor envisions that hollow micro spheres provide a much safer method for storing and transporting hydrogen. Each micro-sphere acts as its own pressure vessel. At 50 µm or smaller in diameter and with a wall of 1 µm or less in thickness, each micro-sphere contains a minute amount of hydrogen. However, a large number of micro-spheres can be bunched together in a tank which can be made out of light weight materials such as plastics due to the fact that the tank does not have to be under a high pressure. This would make for a sizeable storage system that weighs much less than a traditional heavy steel tank. In an accident, the micro-sphere system would not break to release a large quantity of hydrogen, as would the rupture of a big tank of gas. Instead, some of the micro-spheres would just spill onto the ground. A limited number of micro-spheres could possibly break, but releasing only minute amounts of hydrogen.

It is further envisioned that, when fully implemented for automotive applications, the system could provide a level of convenience comparable to the situation of today's drivers filling up their cars with gasoline at a convenient gas station. The refueling of micro-spheres in a car could be accomplished in two steps. First, a vacuum would suck the used micro-spheres out and send them to a tank for refilling of hydrogen. New, hydrogen-filled micro-spheres could then pumped in from a different tank. The consumer would not see much difference from today's system. The micro-spheres are very light, inexpensive and can be repeatedly filled and refilled without degradation.

Shortcomings of the Teitel System: (1) The system requires two tanks: one primary tank containing heavy metal hydride and the supplementary micro-sphere tank; the latter primarily playing a secondary role of recharging the primary tank. Such a heavy and complex system may not be very suitable for automotive and aerospace applications and is totally unfit for portable device applications (e.g., for use in fuel cells to power computers, cell phones, and other micro-electronic devices). It would be advantageous to utilize a hydrogen supply system based on micro-spheres alone. (2) In the Teitel system, heating of the micro-spheres for releasing the hydrogen requires blowing the micro-spheres with hot gases or powering an electrical heating element to heat up the micro-spheres. In either case, a significant amount of energy would be consumed to heat the glass or ceramic spheres to a temperature close to the glass transition temperature or softening point in order to achieve a reasonable hydrogen gas release rate. This is because both glass and ceramic materials have very high glass transition and softening points (hereinafter denoted as Tg) and, as such, have very low gas permeability at room temperature, which is a good feature for hydrogen storage but is bad for hydrogen release when a fuel cell needs a good hydrogen supply rate. By contrast, polymers have a relatively high permeation coefficient at room temperature and the coefficient normally becomes even greater when the temperature approaches Tg. This is an undesirable feature for hydrogen storage, but can be good for hydrogen release. (3) A maximum hydrogen storage pressure of 10,000 psi, cited by Teitel, reflects the notion that this pressure is limited by the tensile strength of the micro-sphere shell or wall material. The use of conventional plastic, carbon, glass, and ceramic micro-spheres with a diameter of 5–500 µm cannot be reliably used to contain hydrogen at any pressure near 10,000 psi or higher.

Hence, an object of the present invention is to provide a material composition that has a higher hydrogen storage capacity. Such a composition can be used in a safe, reliable, and simple hydrogen storage and supply system that is capable of feeding hydrogen fuel to a power-generating device such as a hydrogen combustion engine or fuel cell.

Another object of the present invention is to provide a hydrogen storage and supply material that is particularly suitable for feeding hydrogen fuel to fuel cells for use in apparatus such as portable electronic devices, automobiles and unmanned aerial vehicles (UAV) where device weight is a major concern.

Still another object of the present invention is to provide a hydrogen storage and supply material composition and a related method that, in combination, are capable of feeding hydrogen fuel to fuel cells at an adequate and controlled rate.

SUMMARY OF THE INVENTION

In one preferred embodiment, the present invention provides a core-shell composition for gas storage and supply applications. The core comprises a hollow or porous structure and the shell comprises a nanocomposite material. This nanocomposite is primarily composed of an exfoliated layered filler, in the form of separate, thin platelets, dispersed in a matrix material (preferably a polymer). The layered filler preferably includes a platelet having a dimension smaller than 200 nanometers and an aspect ratio greater than 25. The filler comprises an exfoliated graphite (containing nano-scaled graphene plates) or an exfoliated clay (ultra-thin silicate platelets). The silicate-based filler may be selected from the group consisting of bentonite, vermiculite, montmorillonite, nontronite, beidellite, volkonskoite, hectorite, saponite, laponite, sauconite, magadiite, kenyaite, ledikite and mixtures and solutions thereof. The nanocomposite has a tensile or flexural strength typically greater than 10,000 psi or 689.5 MPa and more typically greater than 50,000 psi or 3.45 GPa when a desired platelet orientation is achieved. Preferably, the nanocomposite contains a volume fraction of nano platelet filler in the range of 0.1% to 30% to achieve the desired strength and gas permeability properties.

Another preferred embodiment of the present invention is a normally closed container that contains therein a plurality of the aforementioned nanocomposite shell-core compositions to store gas molecules inside the compositions. The container is equipped with means for releasing the gas molecules.

In another embodiment, a hydrogen gas storage and supply method is disclosed. The method comprises the following steps: (a) providing a plurality of nanocomposite based shell-core compositions as defined above with these compositions being pre-filled with pressurized hydrogen gas and enclosed in a container, wherein the compositions comprise a polymer having a glass transition temperature or softening temperature, Tg, no greater than 300° C.; and (b) heating the shell-core compositions to a temperature within the range of $[T_g-20]<T<[T_g+20]$, or sufficient to cause diffusion of hydrogen outside the compositions to provide hydrogen fuel from the container to a hydrogen-consuming device such as a fuel cell or hydrogen fuel combustion engine.

DETAILED DESCRIPTION OF PREFERRED EMBODIMENTS

A. Nanocomposite Shell-Core Compositions

Figure 1:
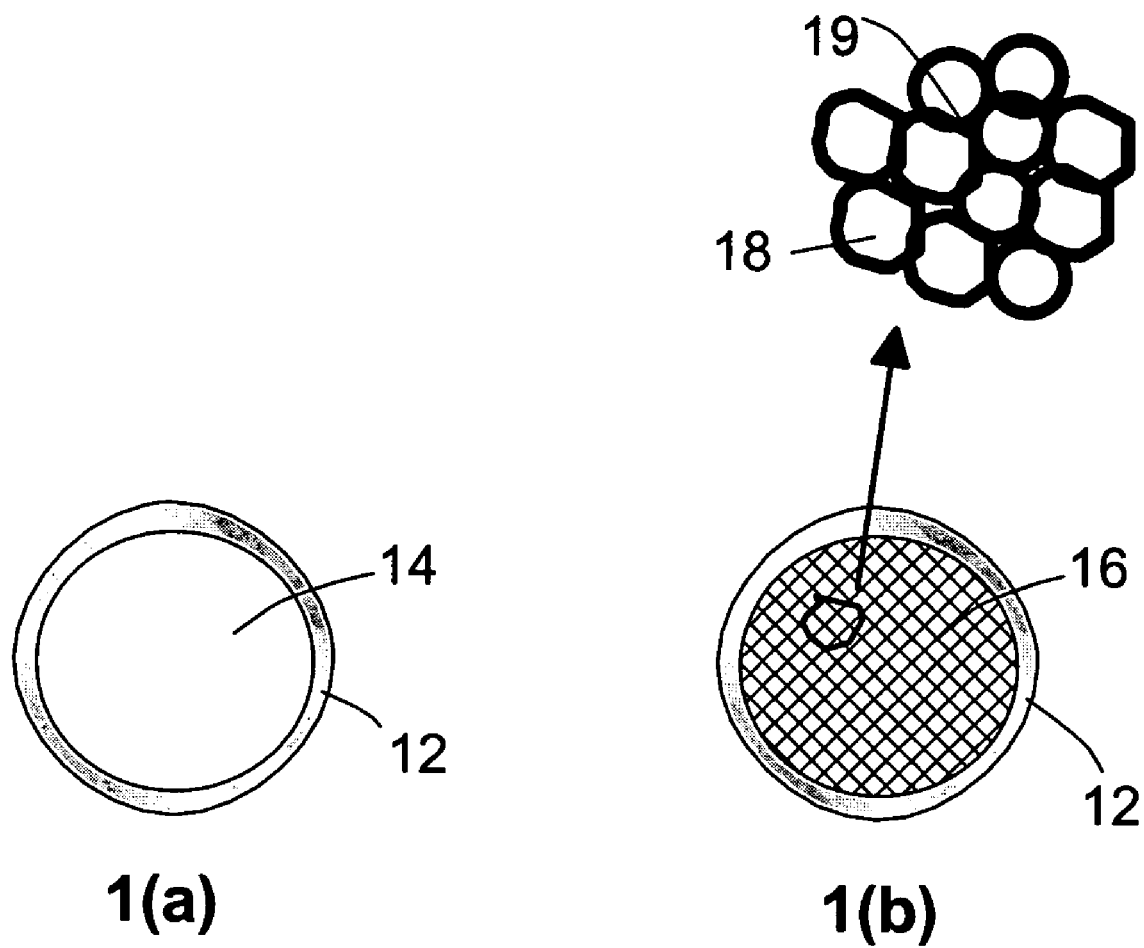
FIG. 1 Schematic of prior-art shell-core spheres: (a) shell-hollow core sphere and (b) shell-porous core spheres with the shell and pore wall being made of a plastic or glass material.

Two prior-art shell-core (or core-shell) compositions that can be used to store and supply hydrogen fuel to a fuel cell or other hydrogen-consuming apparatus, as perceived by Teitel, are schematically shown in FIG. 1(a) and FIG. 1(b). These compositions are also herein referred to as spheres or micro-spheres, although they are not necessarily spherical in shape. The composition shown in FIG. 1(a) is composed of a glass or plastic shell 12 and a hollow core 14. The shell 12 provides the needed mechanical integrity to contain gas molecules inside the hollow core 14 under a reasonably high gas pressure, P. The composition shown in FIG. 1(b) is composed of a glass or plastic shell 12 and a micro- or nano-porous core 16. The shell 12 provides the needed mechanical strength to contain gas molecules inside the pores 18 of the porous core 16 under a gas pressure, P. Individual pores, nanometer- or micrometer-scaled, are separated by a pore wall 19. The maximum pressure that these shell-core compositions can withstand is dictated by the shell and pore wall strength. Gas molecules inside these small "pressure vessels" tend to gradually diffuse through the shell and escape into the open air unless the shell has a high resistance to gas permeation.

The glass, ceramic, carbon or plastic spheres as conceived by Teitel suffer from the following problems: (1) Plastics and bulk carbon materials are weak and ceramic and glass materials are brittle. Although ceramic and glass materials can have a high strength under compression, they normally exhibit a very low strength under tension due to their brittleness (not resistant to crack initiation and growth). (2) The sphere size range, 5–500 µm, as suggested by Teitel, is not a most desirable range due to the fact that the defect size and number of defects in a ceramic or glass part tend to scale with the part dimension. This implies that larger parts tend to have a lower strength. It would be most desirable to keep the glass shell-core spheres under 5 µm in diameter, which was not recognized by Teitel. (3) Although polymers (including plastics and rubbers) by themselves are of low density, they tend to show high gas permeability values. Ceramic and glass materials, although showing somewhat better gas permeation resistance, are of high density and more difficult to process. Further, when demanded, hydrogen gas molecules are not able to diffuse out of rigid glass or ceramic structures at a sufficiently high rate unless the materials are heated to very close to their glass transition or softening points (Tg), which are very high for both glass and ceramic materials.

Figure 2:
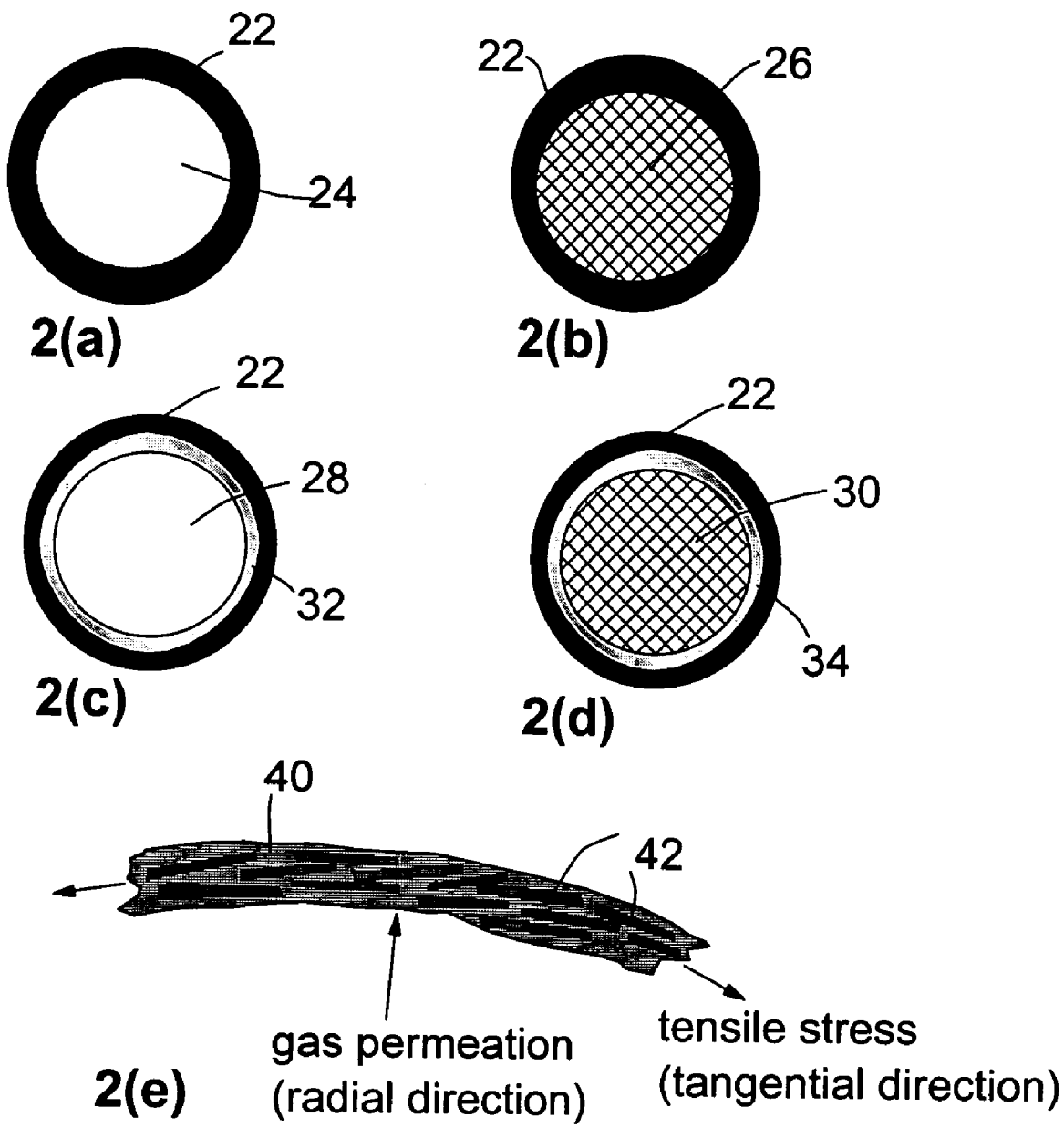
FIG. 2 Schematic of a core-shell structure: (a) nanocomposite shell-hollow core, (b) nanocomposite shell-porous core, (c) nanocomposite shell-intermediate shell-hollow core, (d) nanocomposite shell-intermediate shell-porous core, and (e) a minute volume element of the nanocomposite shell.

A re-visit of the ideal gas law (n/V=P/RT) indicates that the number of moles (n) of hydrogen molecules that can be stored in a micro-sphere of volume (V) is proportional to the internal pressure (P), which is limited by the micro-sphere strength. For instance, by increasing the shell strength of the shell-core micro-sphere from 5,000 psi to 50,000 psi, one can increase the hydrogen storage capacity by 10 times. The gas-retaining ability of shell-core micro-spheres can be improved if the gas permeability of the shell structure is reduced. Both technical goals have been achieved by the presently invented shell-core compositions with the shell comprising a platelet-reinforced nanocomposite material, as schematically shown in FIG. 2.

As a preferred embodiment of the present invention, the shell-core structure of FIG. 2(a) features a nanocomposite shell 22 and a hollow core 24 and that of FIG. 2(b) a nanocomposite shell 22 and a porous core 26. The porous core contains micro- and/or nano-porous pores or cavities separated from one another by a thin wall or membrane. This wall can be of the same material composition as the shell, but can be different, e.g., made of a polymer. The shell-core composition of FIG. 2(c) contains a hollow core 28 formed by an intermediate shell 32, which is in turn fully encapsulated by an outer shell 22 of nanocomposite. FIG. 2(d) shows a similar composition, with an outer nanocomposite shell 22, an intermediate shell 34, and a porous core 30. The intermediate shell in either FIG. 2(c) or FIG. 2(d), and the pore wall in FIG. 2(d) may be composed of a polymer, glass, ceramic, or carbon. The shell thickness is preferably smaller than 50% of the radius of a shell-core sphere, preferably smaller than 20%, and most preferably smaller than 10% in order to maximize the gas storage volume.

FIG. 2(e) schematically shows a minute volume element of the nanocomposite shell, which is composed of expanded, exfoliated or separated graphite or clay layers (platelets) dispersed in a polymer matrix. These platelets have one dimension (thickness) smaller than 200 nanometers (nm), preferably smaller than 100 nm, and most preferably smaller than 20 nm. The other two dimensions (length and width, or diameters) preferably are 1 µm or smaller. The aspect ratio is defined to be a diameter-to-thickness ratio of a substantially circular thin platelet, or a length-to-thickness or width-to-thickness ratio in a substantially rectangular platelet. At least one aspect ratio is preferably greater than 25 and further preferably greater than 50. Further more preferably, both length-to-thickness and width-to-thickness ratios are greater than 25 and most preferably greater than 50. These features are in favor of the formation of overlapping or percolated platelets in a direction approximately perpendicular to the radial direction of a shell-core micro-sphere.

The configuration of overlapping or percolated platelets forms a great barrier against permeation of gas when the hydrogen-filled micro-sphere is in a fuel storage state, typically at room temperature, i.e., no fuel is being drawn out of the micro-sphere. The platelets have an extremely high strength along essentially all directions on the thin platelet plane (normal to the thickness direction). If these platelets are oriented along the tangential direction (with respect to the micro-sphere) or perpendicular to the micro-sphere radial direction, they impart an extremely high tensile strength to the shell that helps to dramatically increase the tolerable internal gas pressure, P. This leads to a greatly enhanced hydrogen storage capacity (n/V).

Nanocomposites are compositions in which at least one of its constituents has one or more dimensions, such as length, width or thickness, in the nanometer size range. The nanocomposite of the presently invented shell-core structure is further characterized as follows: The platelet fillers may be selected from two broad categories of materials that have extremely thin layers or platelets being laminated together: graphite-like and clay materials. These basically layer-like structures may be subjected to exfoliation treatment to produce individual layers or a small number of layers (e.g., 2–100 layers bonded together) each having a thickness that can be as small as 0.34 nm, but typically in the range of 1–100 nm. Once exfoliated and separated from one another, these platelet structures (typically 1–100 layers) may be uniformly dispersed throughout a matrix polymer. The relatively large surface area of the clay or graphite platelet filler, if uniformly dispersed, may provide more interfaces between the filler and the polymer, and may subsequently improve the physical properties, by reducing the mobility of the polymer chains at these interfaces and by providing exceptional stress-bearing capabilities. Most significant feature for hydrogen storage applications is the notion that these platelets are extremely compact, ordered structures that are covalent-bonded along all directions on the platelet plane and, hence, are highly effective barriers against gas diffusion.

Figure 3:
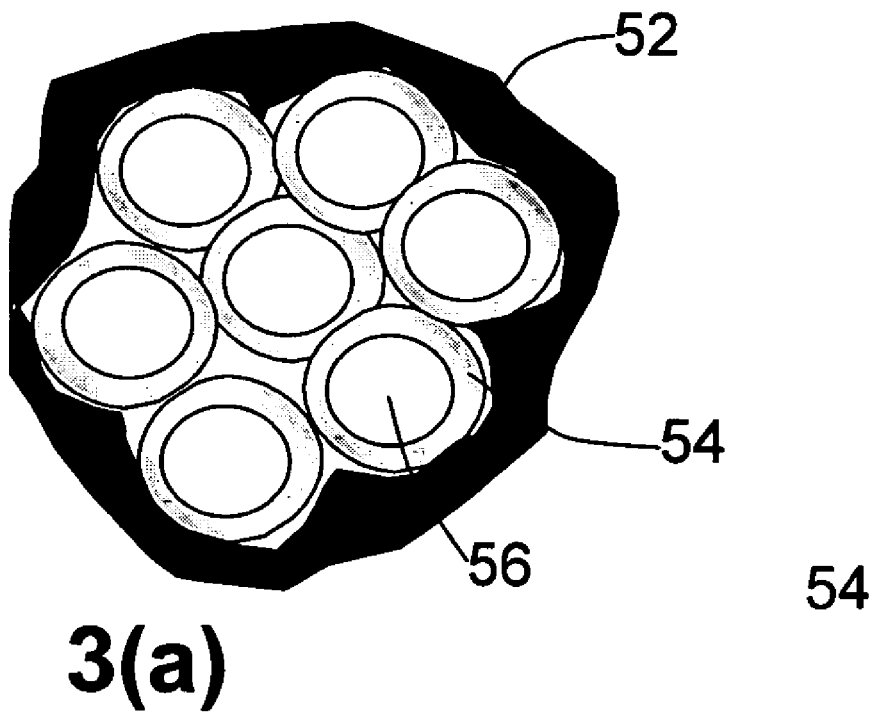
FIG. 3 Schematic of a nanocomposite shell-multiple-cavity core structure: (a) core containing a plurality of hollow micro-spheres and (b) core containing a plurality of porous micro-spheres.
Figure 3:
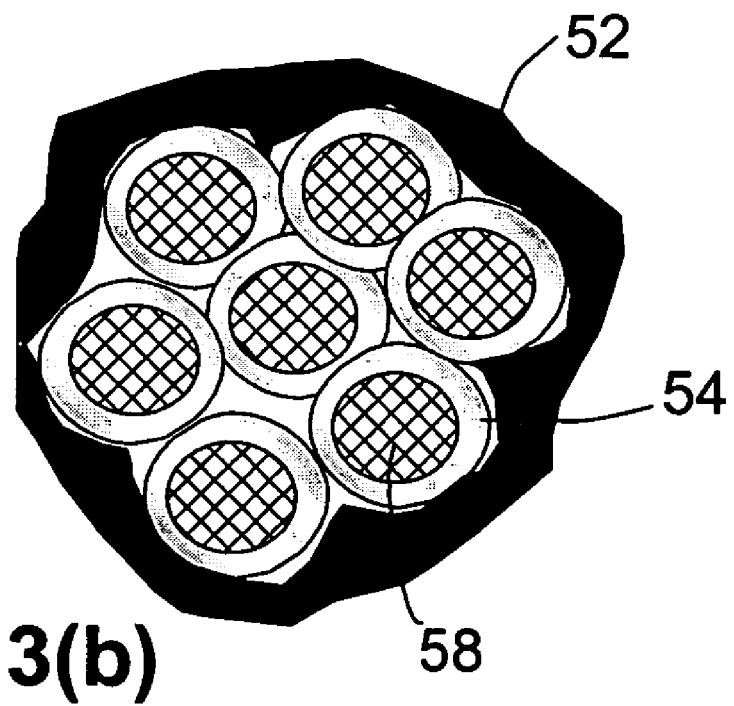

As another embodiment of the present invention, the nanocomposite shell 52 may encapsulate a multiplicity of hollow micro-spheres (FIG. 3(*a*)) or a multiplicity of porous micro-spheres (FIG. 3(*b*)). The hollow micro-spheres may each be comprised of a shell 54 and a hollow core 56. The porous micro-spheres may each be comprised of a shell 54 and a micro- or nano-porous core 58. Again, the shell and pore wall material may be a polymer, glass, ceramic, carbon, or composite material. These slightly larger multi-cavity particles have an advantage in that the amount of nanocomposite shell material needed is lower than if individual micro-spheres are each encapsulated by a nanocomposite shell. However, these particles are preferably kept to be smaller than 100 μm in size, further preferably smaller than 10 μm and most preferably smaller than 5 μm to reduce the potential defect size in the nanocomposite shell 52.

B. Preparation of Polymer-Clay Nanocomposite Shell-Core Compositions

Figure 4:
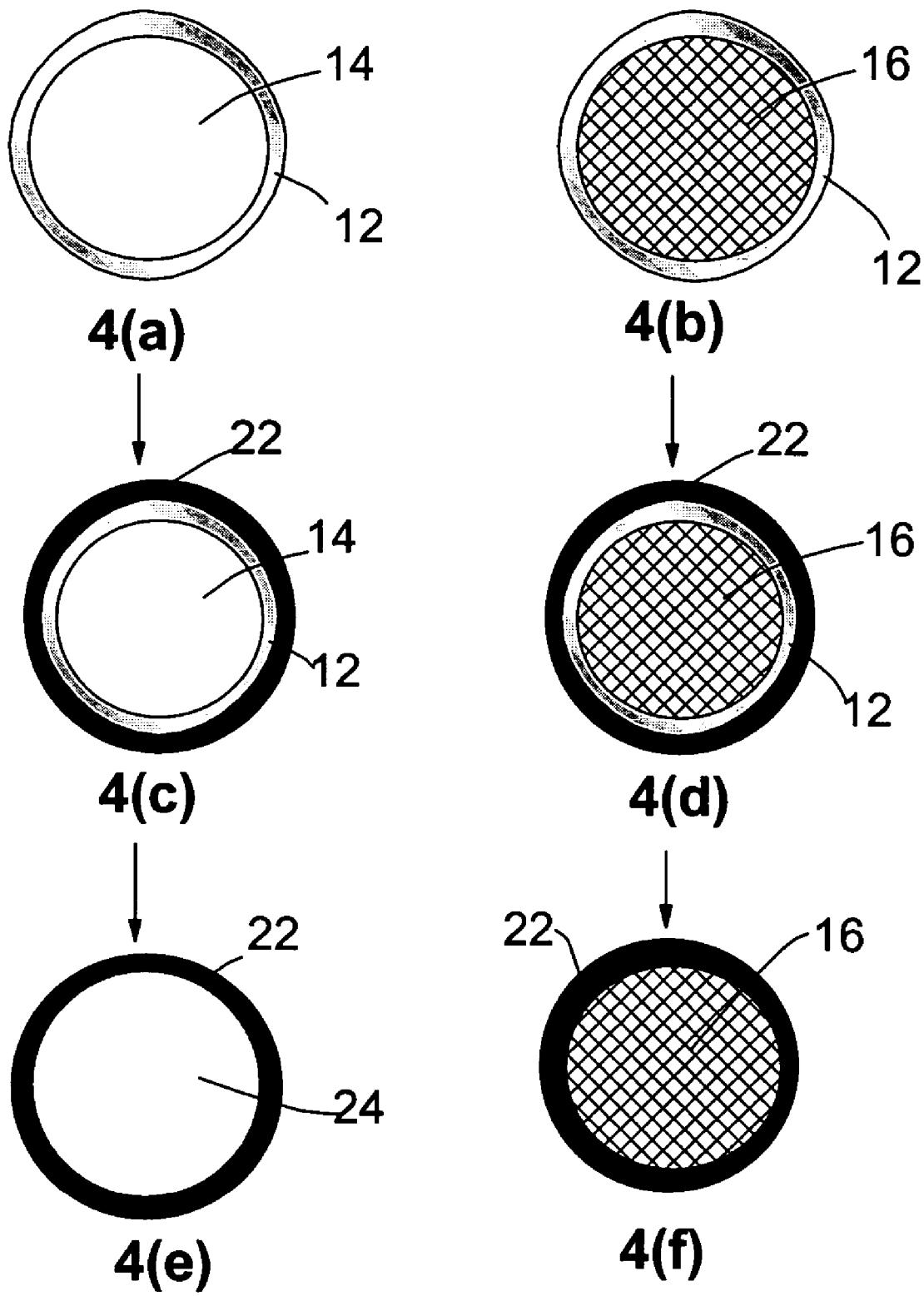
FIG. 4 Procedures that can be followed to produce nanocomposite shell-core composition; (a)–( c)–(e) for shell-hollow core micro-spheres and (b)–(d)–(f) for shell-porous core micro-spheres.

The diagrams in FIG. 4 schematically illustrate preferred ways of preparing the polymer-platelet nanocomposite shell-core compositions, including both clay- or graphite-based platelets. Shown on the left-hand side of FIG. 4 is a procedure for preparing a nanocomposite shell-hollow core structure. The procedure begins with the preparation of shell-hollow core micro-spheres (FIG. 4(*a*)) with a non-composite shell material (e.g., a polymer), which is then coated with a thin nanocomposite coating composition to form a structure as shown in FIG. 4(*c*), which is the desired structure indicated in FIG. 2(*c*). If a structure like FIG. 4(*e*) or FIG. 2(*a*) is desired, the intermediate shell 12 in FIG. 4(*c*) may then be removed through a solvent dissolving or leaching step.

Shown on the right-hand side of FIG. 4 is a procedure for preparing a nanocomposite shell-porous core structure. The procedure begins with the preparation of shell-porous core micro-spheres (FIG. 4(*b*)) with a non-composite shell material (e.g., a polymer), which is then coated with a thin nanocomposite coating composition to form a structure as shown in FIG. 4(*d*), which is the desired structure indicated in FIG. 2(*d*). If a structure like FIG. 4(*f*) or FIG. 2(*b*) is desired, the intermediate shell 12 in FIG. 4(*d*) may then be removed through a solvent dissolving or leaching step. The space created can be naturally filled in by the un-cured or partially cured nanocomposite shell material that is still capable of flowing at this stage.

A clay mineral is typically composed of hydrated aluminum silicates that are fine-grained and have a platelet-forming habit. The crystalline structure of a typical clay mineral is a multi-layered structure comprised of combinations of layers of $SiO_4$ tetrahedra that are joined to layers of $AlO(OH)_2$ octahedra. The term "gallery" is used herein to describe the interlayer space of the layered clay minerals. The terms "d-spacing" or "basal spacing" define the sum of the single layer thickness and the thickness of the interlayer or gallery, which is the repeat unit of the multi-layer mineral. The gallery may contain water and/or other constituents such as potassium, sodium, or calcium cations, depending on the clay type. Clay minerals may vary with respect to the combination of their constituent layers and cations. Isomorphic substitution of the cations of clay mineral, such as $Al^{3+}$ or $Fe^{3+}$ substituting for the $Si^{4+}$ ions in the tetrahedral network, or $Al^{3+}$, $Mg^{3+}$ or $Fe^{3+}$ substituting for other cations in the octahedral network, occurs quite commonly. These substitutions may impart a net negative charge on the clay structure. Naturally occurring elements within the gallery of the clay, such as water molecules, sodium cations or potassium cations, are attracted to the surface of the clay layers due to this net negative charge.

Polymer-clay nanocomposites can be characterized as being one of several general types: intercalated nanocomposite, exfoliated nanocomposite, or combinations thereof. The term "intercalated nanocomposite" describes a nanocomposite that consists of a regular insertion of the polymer in between the clay layers. The term "exfoliated nanocomposite" describes a nanocomposite wherein the 1 nm-thick layers of clay are dispersed in the matrix forming a composite structure on the micro-scale. The latter type of composite, or exfoliated nanocomposite, maximizes the polymer-clay interactions thereby making the entire surface of the clay layers available for the polymer. This modification may lead to the most dramatic changes in mechanical and physical properties of the resulting polymer. In contrast, the term "conventional composite" describes a composite where the clay acts as a conventional filler and is not dispersed on a nano-scale. These composites generally do not exhibit the improvement in mechanical and physical properties seen with exfoliated nanocomposites. In certain embodiments of the present invention, some portion of the clay in the polymer-clay nanocomposites may exist as structures larger than exfoliated or intercalated composites.

The silicate-based clay filler used in the present invention may be selected from the group consisting of bentonite, vermiculite, montmorillonite, nontronite, beidellite, volkonskoite, hectorite, saponite, laponite, sauconite, magadiite, kenyaite, ledikite and mixtures and solutions thereof. Due to the nanoscale dimensions of the reinforcement phase, nanocomposites display unique and improved properties compared to that of micro- or macro-composites. A wealth of unique properties and technological opportunities are offered by these materials.

The exfoliation of layered clay-like materials is well-known in the art. For instance, phyllosilicates, such as smectite clays (e.g., sodium montmorillonite and calcium montmorillonite), can be treated with organic molecules, such as organic ammonium ions, to intercalate the organic molecules between adjacent, planar silicate layers, thereby substantially increasing the interlayer (interlaminar) spacing between the adjacent silicate layers. The thus-treated, intercalated phyllosilicates, having interlayer spacing of at least about 10–20 Angstroms (1–2 nm) and up to about 100 Angstroms (10 nm), then can be exfoliated (e.g., the silicate layers are separated) mechanically (e.g., by high shear mixing) or thermally (e.g., rapid temperature rising). The individual silicate layers, when admixed with a matrix polymer, before, after or during the polymerization of the matrix polymer (e.g., a polyamide) have been found to substantially improve one or more properties of the polymer, such as mechanical strength and/or high temperature characteristics.

The intercalate may be formed, with the interlayer spacing between adjacent silicate platelets being increased, by adsorption of a silane coupling agent or an onium cation, such as a quaternary ammonium compound, having a reactive group which is compatible with the matrix polymer. Such quaternary ammonium cations are well known to convert a highly hydrophilic clay, such as sodium or calcium montmorillonite, into an organophilic clay capable of sorbing organic molecules. Direct intercalation (without solvent) of several polymers such as polystyrene and poly(ethylene oxide) in organically modified silicates also have been reported. For the purpose of preparing a coating or suspension solution composition containing a polymer-clay nanocomposite for use in practicing the present invention, one may choose to prepare an exfoliated clay platelet phase dispersed in a monomer or oligomer matrix (referred to as a reactive matrix), which can be polymerized to become a thermoplastic material or cured to become a thermoset resin. The matrix may be a thermoplastic that is used to directly intercalate the layer galleries. The resulting nanocomposite may be diluted with a dilutant or solvent to control the solution or suspension viscosity.

Methods for the production of polymer particles that are hollow or core-sheath polymer particles that contain voids (pores) are disclosed by Blankenship, et al. (U.S. Pat. No. 4,594,363 (Jun. 10, 1986)); Touda, et al. (U.S. Pat. No. 5,077,320, (Dec. 31, 1991)); and Walt, et al. U.S. Pat. No. 6,720,007 (Apr. 13, 2004). For instance, Blankenship, et al developed a process for making core-sheath polymer particles containing voids. The process includes (A) emulsion-polymerizing a core from a core monomer system comprised of at least one ethylenically unsaturated monomer containing acid functionality; (B) encapsulating the core with a hard sheath by emulsion polymerizing a sheath monomer system in the presence of the core with the sheath permitting penetration of fixed or permanent bases; (C) swelling at elevated temperature the resultant core-sheath polymer particles with fixed or permanent base so as to produce a dispersion of particles which, when dried, contain a micro-void. The process proposed by Touda, et al can be used to produce polymer particles containing one void or multiple voids. The process includes (a) adding a base to a latex of a carboxyl-modified copolymer containing 0.1 to 1000 parts of an organic solvent per 100 parts by weight of the carboxyl-modified copolymer to neutralize at least part of the carboxyl groups in the copolymer, and (b) adding an acid to the latex to adjust the pH of the latex to not more than 7.

The polymer core-sheath particles prepared from the above-cited procedures or other prior-art processes may then be coated with a nanocomposite-containing solution or suspension. Procedures for coating of polymer particles or glass beads by a solution or suspension are also well-known in the art. We have found the following procedures suitable for producing nanocomposite shell-hollow core and nanocomposite shell-porous core micro-spheres. In a simple approach, one may disperse the hollow polymer micro-spheres or the polymer shell-porous core spheres in a diluted nanocomposite suspension or solution with the resulting liquid mixture being subjected to ultrasonic waves to avoid excessive agglomeration of coated particles. The solvent or dilutant is then removed to produce dry particles such as those shown in FIG. 4(c) or FIG. 4(d). In some cases, the products were found to contain particles as shown in FIG. 3(a) and FIG. 3(b) due to agglomeration.

If so desired, the solvent may be selected in such a manner that the solvent can penetrate through the nanocomposite shell and then dissolve the intermediate polymer shell (e.g., 12 in FIG. 4(c) or FIG. 4(d)) and eventually at least partially leach out the intermediate shell material. This material can be made to be of lower molecular weight and non-cross-linked chains to facilitate dissolution and leaching to produce the structures of FIG. 4(e) or FIG. 4(f).

Alternatively, the dried hollow polymer micro-spheres or polymer shell-porous core micro-spheres may be forced to flow around inside a fluidized bed while a stream of nanocomposite suspension or solution is sprayed over these micro-spheres. This process tends to produce individual nanocomposite shell-core particles with significantly reduced level of agglomeration. The particles are mostly those depicted in FIG. 2(c) and FIG. 2(d), with a minimal amount of particles such as those in FIG. 3(a) or FIG. 3(b).

Direct production of nanocomposite shell-core compositions without going through the intermediate step of forming polymer or glass micro-spheres is described as follows: Lorah, et al. (U.S. Pat. No. 6,759,463, Jul. 6, 2004) proposed a method for preparing hollow polymer-clay nanocomposite particles from ethylenically unsaturated monomers. The method includes providing an aqueous emulsion of a multi-stage emulsion polymer. The multi-stage emulsion polymer comprises: (a) a core stage polymer including an aqueous polymer-clay nanocomposite composition comprised of polymerized units of at least one ethylenically unsaturated monomer, at least one unmodified clay, and at least one modifying agent wherein the clay is lightly modified prior to the formation of the shell stage polymer and (b) a shell stage polymer comprising polymerized units of at least one ethylenically unsaturated monomer and at least one lightly modified clay. The core stage polymer is swollen with at least one swelling agent and optionally one ethylenically unsaturated monomer such that at least a portion of the core stage polymer contacts at least a portion of the shell stage polymer. The monomer is then polymerized to form the polymer-clay nanocomposite particles which become hollow upon drying.

This method was an extension of the method cited earlier (e.g., by Blankenship, et al., U.S. Pat. No. 4,595,363) for producing hollow polymer sheath-core particles. However, we have found that this method, as proposed by Lorah, et al. tends to produce a particle with a very thick wall and very small hollow core; typically with the wall thickness greater than 50%-70% of the particle radius. This certainly would have resulted in having only a small space for gas storage.

Apparently, Loral, et al. have not recognized that these particles can be used for hydrogen storage and have not fairly suggested how one could obtain properly sized hollow structures. We have found that, with the polymer compositions as suggested by Lorah, et al, one must swell the core stage polymer by a linear factor of approximately 2.5 (radius enlarged by a factor of 2.5) in order to achieve a hollow particle with a wall thickness smaller than 50% of the total particle radius when the particle is dried after polymerization of the shell.

C. Preparation of Polymer-Graphite Platelet Nanocomposite Shell-Core Compositions The applicant and his colleagues have recently developed a process for producing individual nano-scaled graphite planes (individual graphene sheets) and stacks of multiple nano-scaled graphene sheets, which are collectively called "nano-sized graphene platelets (NGPs)." The structures of these materials may be best visualized by making a longitudinal scission on the single-wall or multi-wall of a carbon nano-tube along its tube axis direction and then flattening up the resulting sheet or plate. These nano materials could potentially become cost-effective substitutes for carbon nano-tubes or other types of nano-rods for various scientific and engineering applications.

NGPs can be readily produced by the following procedures: (1) providing a graphite powder containing fine graphite particles (particulates, short fiber segments, carbon whisker, graphitic nano-fibers, or combinations thereof) preferably with at least one dimension smaller than 200 μm (most preferably smaller than 1 μm); (2) exfoliating the graphite crystallites in these particles in such a manner that at least two graphene planes are either partially or fully separated from each other, and (3) mechanical attrition (e.g., ball milling) of the exfoliated particles to become nano-scaled to obtain the resulting NGPs. The starting powder type and size, exfoliation conditions (e.g., intercalation chemical type and concentration, and temperature cycles), and the mechanical attrition conditions (e.g., ball milling time and intensity) can be varied to generate, by design, various NGP materials with a wide range of graphene plate thickness, width and length values. This implies that the aspect ratios such as length-to-thickness ratio and width-to-thickness ratio (for an approximately rectangular platelet) or diameter-to-thickness ratio (for an approximately cylindrical platelet or "disk") can be custom-made. We have found that these ultra-high strength NGPs impart extremely high strength and stiffness to a polymer when NGPs are properly dispersed in the matrix polymer to form a nanocomposite.

Once a nanocomposite suspension or solution is prepared, similar procedures as described earlier for polymer-clay nanocomposite may be followed to prepare the desired NGP-based nanocomposite shell-core compositions for hydrogen storage. These NGP nanocomposite micro-spheres exhibit much high strength than their clay-based counterparts.

EXAMPLE 1

Preparation of Nano-Scaled Graphene Plate (NGPs) Based Nanocomposites

Natural flake graphite with an average size of 500 μm was subjected to an acid treatment by preparing a mixture of concentrated sulfuric acid and nitric acid at a 4:1 ratio, mixing a desired amount of graphite flakes in this acid mixture, and stirring the resulting "slurry" continuously for 16 hours. The acid-treated graphite sample was washed with water and then dried at 90° C. to remove water. The dried particles were then placed in a furnace preset at 650° C. for 2 minutes to obtain exfoliated graphite, which was then subjected to a mechanical attrition using a high-intensity planetary ball mill for 24 hours to produce NGPs. Portions of this NGP sample were then mixed with a matrix polymer or monomer to prepare several master batches of NGP-based nanocomposite coating compositions:

Master batch (A): Suspensions comprising NGPs+Polystyrene+toluene

Master batch (B): Mixtures of NGPs+epoxy resin+curing agent

Master batch (C): Latex emulsions of NGPs

EXAMPLE 1-A

From Expandable Polystyrene Beads

The production procedures for foamed plastics are adapted herein for the preparation of porous plastic beads. Micrometer-sized polystyrene (PS) beads were subjected to a helium gas pressure of approximately 7 atm and a temperature near 90° C. (inside a pressure chamber) for two hours, allowing helium gas molecules to diffuse into PS beads. The chamber was then cooled down to room temperature under a high helium gas pressure condition to seal in the gas molecules. These gas-filled beads were then placed in an oven preset at 110° C., allowing the supersaturated gas molecules to try to diffuse out and, thereby, producing micro-porous PS beads or "foamed" beads. These micro-porous beads were then poured onto a suspension of [NGPs+PS+toluene] (Master batch (A)) and stirred for approximately 5 minutes until essentially all beads were coated with a uniform thin film of this suspension. The fluid system was then subjected to a continuous ultrasonic wave treatment (sonification) while the solvent (toluene) was being removed under a ventilated chemical hood. Separated NGP nanocomposite shell-porous PS core spheres were produced after 5 hours of solvent evaporation.

EXAMPLE 1-B

From Expandable Coated-Polystyrene Beads

Again, the production procedures for foamed plastics are adapted herein for the preparation of porous plastic beads coated with a nanocomposite shell. Micrometer-sized polystyrene (PS) beads were poured onto a suspension of [NGPs+PS+toluene] (Mater batch (A)) and stirred for approximately 5 minutes at room temperature until essentially all beads were coated with a uniform thin film of this suspension. (One must bear in mind that toluene is a good solvent for polystyrene and, hence, the toluene proportion must be kept to a minimum) The fluid system was then subjected to a continuous ultrasonic wave treatment (sonification) while the solvent (toluene) was being removed under a ventilated chemical hood. The resulting nanocomposite-coated PS beads, after solvent removal, were then subjected to a helium gas pressure of approximately 7 atm and a temperature near 90° C. (inside a pressure chamber) for three hours, allowing helium gas molecules to diffuse through the coating layer into the bulk of PS beads. The chamber was then cooled down to room temperature under a high helium gas pressure condition to seal in the gas molecules. These gas-filled, nanocomposite-coated beads were then placed in an oven preset at 110° C., allowing the supersaturated gas molecules to try to diffuse out (beads being expanded) and, thereby, producing nanocomposite shell-micro-porous PS core spheres or "structural foamed" beads. It was surprising to observe that these spheres have a solid, non-porous skin or shell layer in which nano-scaled graphene platelets were bi-axially oriented tangentially to the sphere, or perpendicular to the radial direction of the bead. This bi-axial orientation appears to have been caused by the bead expansion operation, which biaxially stretched the material in the coating layer (both the polymer chains and reinforcement platelets were stretched or re-orientated), much like a balloon was blown. This bi-axial orientation of both the PS chains and the nano platelets significantly enhanced the strength of the shell structure on these otherwise porous beads (cores), as evidenced by the much improved crush strength as compared with the materials prepared in Example 1-A.

Quantitatively, thin films of NGP (20% by volume) dispersed in a high-impact polystyrene matrix were prepared using spin casting. The resulting films, with thickness values ranging from approximately 2 to 25 µm, were cut into small dumbbell-shape specimens for tensile testing. The tensile strengths of these nanocomposites were found to vary between approximately 16,000 (if NGPs were randomly oriented on the thin film plane) and 90,000 psi (NGPs were highly oriented in the tensile loading direction).

EXAMPLE 1-C

From Polymer Hollow Spheres

Sub-micrometer polymer hollow spheres prepared from emulsion polymerization were mixed with Master batch (B) (mixtures of NGPs+epoxy resin+curing agent) and slightly diluted with acetone. The mixture was then spray-dried to produce nanocomposite-coated latex hollow spheres. The surface coating, containing epoxy and NGPs, was then thermally cured.

EXAMPLE 1-D

Two-Stage Core-Shell Polymerization

A 5-liter round bottomed flask was equipped with paddle stirrer, thermometer, nitrogen inlet and reflux condenser. To 2080 g of deionized water heated to 80° C. was added 5.5 g of sodium persulfate followed by 345 g of an acrylic polymer dispersion (40% solids) with an average particle size of 0.3 micron as the seed polymer. A monomer emulsion consisting of 55.5 g of butyl acrylate, 610.5 g of methyl methacrylate and 444 g of methacrylic acid in 406 g of water and 20 g of sodium dodecyl benzene sulfonate (23%) was added over a 2 hour period. This resulting alkali swellable core is used as the seed polymer for the following reaction:

To an identical 5-liter kettle (now empty) is added 675 g of water. After heating to 80° C., 1.7 g of sodium persulfate followed by 50.5 g (1 part by weight solids) of the above alkali swellable core is added. A monomer emulsion (9 parts by solids) consisting of 110 g of water, 0.275 g of sodium dodecylbenzene sulfonate, and a monomer mixture of 20% butyl methacrylate, 75% methyl methacrylate and 5% methacrylic acid (plus a 10% NGPs by weight with respect to the final dry polymer content) is then added over a 2 hour period to prepare an intermediate reactive mixture. This intermediate mixture is then subjected to treatments of swelling with KOH, further polymerization, and formation of voids, as follows: To a 5-liter flask fitted with reflux condenser, nitrogen inlet and padding stirrer is added 989 g of the intermediate mixture. The reactor is heated to 85° C. and 60.9 g of 10% KOH is added for swelling purpose. The mixture is stirred at 85° C. for 30 minutes and 1.0 g of sodium persulfate is added followed by the addition of a monomer emulsion consisting of 243 g of water, 3.3 g of 23% sodium dodecyl benzene sulfonate and 576 g of styrene over a 1.5 hour period. The sample is heated at 85° C. for 15 minutes and cooled to room temperature. The hollow core sizes of the resulting particles (approximately 2.4 µm), when dried, are approximately in the range of 1.2–2.0 µm.

EXAMPLE 2-A

Polymer-Clay Nanocomposite-Coated Porous Polystyrene Beads

The procedure was similar to that in Example 1-A, except that NGPs were replaced by nano clay platelets of comparable volume fraction.

EXAMPLE 2-B

Polymer-Clay Nanocomposite-Coated Porous Polystyrene Beads

The procedure was similar to that in Example 1-B, except that NGPs were replaced by nano clay platelets of comparable volume fraction. The degree of bi-axial orientation of clay platelets was to a slightly lesser extent as compared with that of NGPs.

EXAMPLE 2-C

From Hollow Glass Spheres

Sub-micrometer hollow glass commercially available were mixed with a mixture of [NGPs+epoxy resin+curing agent] and slightly diluted with acetone. The mixture was then spray-dried to produce nanocomposite-coated hollow glass spheres. The surface coating, containing epoxy and NGPs, was then thermally cured.

D. Hydrogen Release and Supply

Although some glass and ceramic hollow spheres of sufficiently small sizes (e.g., <1 µm) may exhibit relatively high strengths (e.g., up to 10,000 psi) and their strengths can be further enhanced with a nanocomposite coating as herein disclosed, the release of hydrogen through hollow glass or ceramic spheres at a desired rate to meet the needs of an operatingl fuel cell has presented a great technical challenge. This is largely due to the low gas permeability of high-strength glass or ceramic materials and their high glass transition or softening temperatures. Heating of gas-pressurized hollow glass spheres to a sufficiently high temperature (close to their glass transition temperatures (Tg), normally higher than 500°–900° C.) is required in order to have a sufficiently high hydrogen release rate. This would consume great amounts of energy and would take a long time to reach such high temperatures, making it impractical to use these hollow glass spheres to store and supply hydrogen to a fuel cell or a combustion engine.

By contrast, polymers (including plastics, rubbers, etc.) have a much lower glass transition temperature or softening point, typically from well below room temperature upward to 300° C. Amorphous plastics typically have a glass transition temperature from slightly above room temperature to below 200° C. (e.g., polystyrene has a Tg≈100° C.). The hollow spheres or shell-porous core structures made out of these materials would be ideal materials as far as hydrogen release and supply is concerned. Unfortunately, unreinforced plastics and rubbers exhibit relatively low strength and, hence, are not suitable for high-capacity hydrogen storage.

Figure 5:
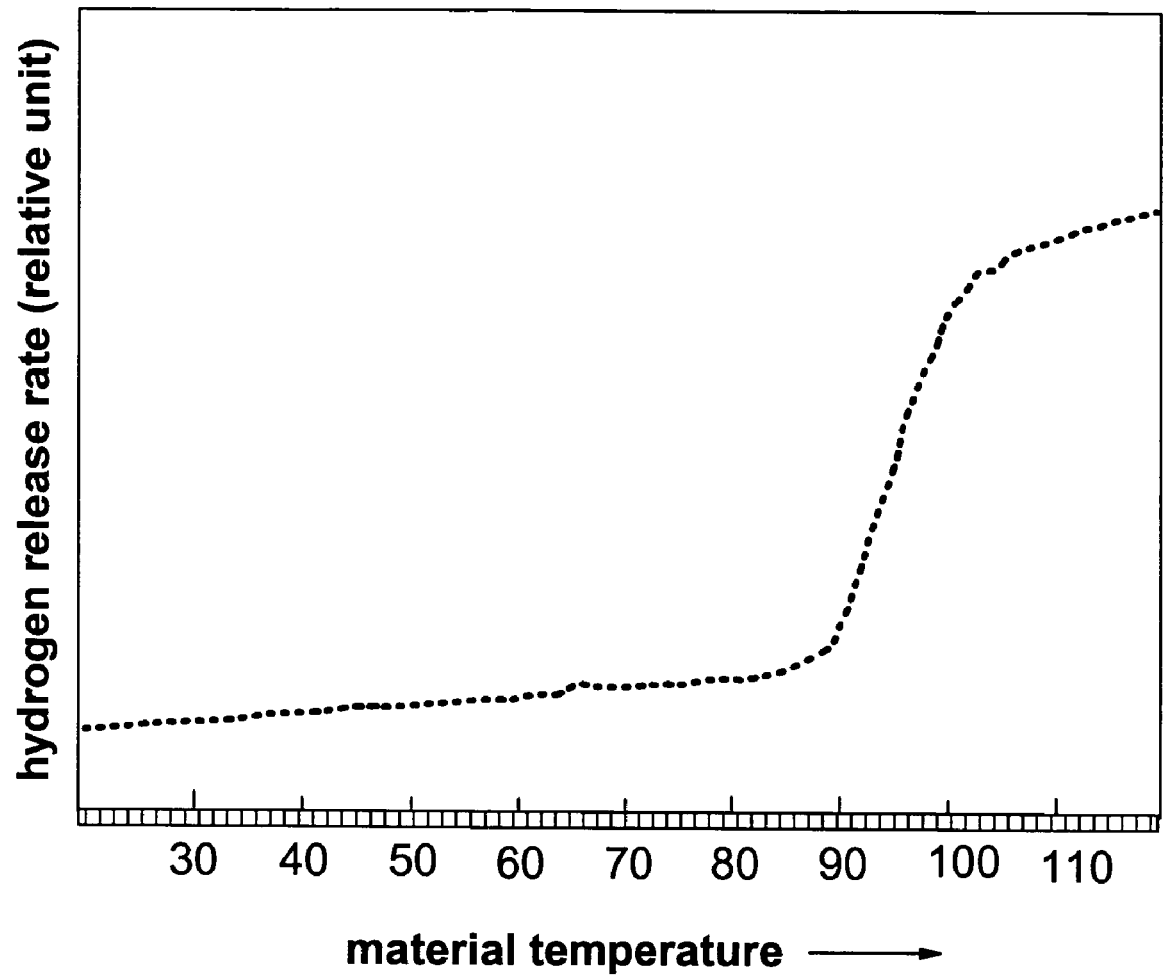
FIG. 5 Hydrogen release rate of nano-scaled graphene platelet-polystyrene nanocomposite shell-porous core micro-spheres as a function of the micro-sphere temperature.

The presently invented nanocomposite shell-core compositions with a hollow core or porous core overcome the above technical difficulties in the following manners: On one hand, the nanocomposite shell dramatically improves the strength of the otherwise relatively low-strength plastics (plastics typically being lower in strength by 3–10 times as compared to glass). The nanocomposite shell actually is stronger than a glass material by a factor of 5–10. The presence of nano-scaled platelets not only increases the strength of the shell, but also reduces the gas permeability through the shell, thereby significantly enhancing the hydrogen storage capability at a temperature lower than Tg of the plastic matrix (e.g., at room temperature for polystyrene). On the other hand, the low Tg's or softening points of the plastic or rubbery core materials and the matrix resin in the nanocomposite shell make it possible (and not too energy-consuming) to rapidly heat up the shell-core compositions to release the hydrogen. We have found that the hydrogen release rate is normally low at room temperature and up to approximately 10–20 degrees Celsius below the Tg of a plastic. Within 10–20 degrees of the Tg (the temperature range varying with the plastic type), appreciable hydrogen release rates commence with the rates increasing rapidly with further temperature increases. The rate gradually reaches a plateau 10–20 degrees above the Tg. For instance, with a Tg of 100° C. as indicated in FIG. 5, polystyrene-based core wall or shell structure will have a processing window of approximately 25 degrees (from 90° C. to 115° C.) in which one can adjust the hydrogen release rate to meet the potentially changing needs of an operating hydrogen fuel-consuming device like a fuel cell.

Figure 6:
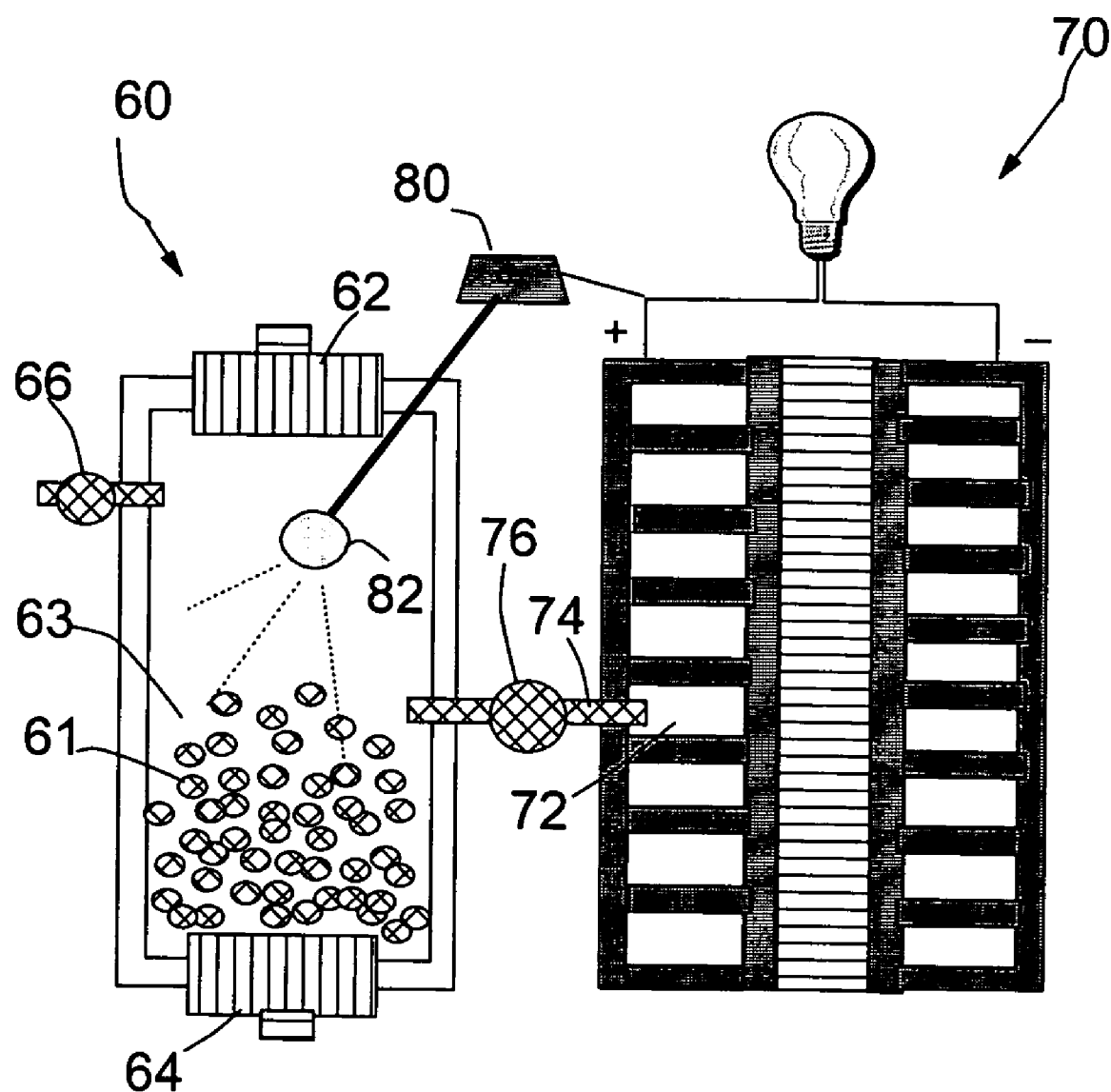
FIG. 6 Schematic of a container containing a multiplicity of nanocomposite shell-core compositions capable of being heated to supply hydrogen gas to a fuel cell.

With the presently invented nanocomposite shell-core compositions, hydrogen may now be safely and conveniently stored in a light-weight container, which can feed hydrogen on demand to a fuel cell. As shown in FIG. 6, a light-weight container 60, made out of a plastic or reinforced plastic, is used to contain nanocomposite shell-core compositions (micro-spheres) 61. The nanocomposite shell-core compositions were pre-filled with hydrogen gas at a high pressure, but the interior space 63 of the container 60 does not have to be at a high hydrogen pressure. It just has to be filled with hydrogen, displacing other types of gases such as nitrogen and oxygen outside the container. However, one may choose to fill the empty space between core-shell spheres with hydrogen gas up to a safe pressure in order to further increase the total hydrogen storage capacity of the system. The container 60 preferably has optional openings 62,64 to allow for refilling of gas-filled micro-spheres and removal of spent micro-spheres, which are to be refilled with hydrogen perhaps at a different location. A safety valve 66 is recommended for preventing any possibility of over-pressure in the container. A conduit 74 with a control valve 76 may be used to transport hydrogen gas, on demand, from the container 60 to a gas diffusion channel 72 on the anode side of a fuel cell 70.

In order to begin the operation of a fuel cell 70, one may choose to turn on the control valve 76 to allow for some hydrogen to flow into the gas diffusion channel 72. The power generated by the fuel cell may be partially fed back to a heating or energizing system (e.g., comprising a control 80 and a heat/energy source 82) to heat up the gas-filled micro-spheres 61 inside the container 60. This source 82 may be, as an example, a heater or an infrared lamp. It may be noted that the operation of a hydrogen-air fuel cell generates a significant amount of heat as an electrochemical reaction by-product. This amount of heat, which is known to be capable of raising the temperature of a proton exchange membrane fuel cell above 100° C., typically becomes wasted in a conventional fuel cell. However, in the presently invented method, this heat can be transferred back to the container 60 as a major auxiliary heat source. This will make the presently invented system a very energy-efficient one. The majority of the power generated by the fuel cell will be utilized by an external electrical appliance such as a personal computer; only a small amount of power will be drawn to help release the hydrogen.

Hence, another preferred embodiment of the present invention is a container that contains therein a plurality of nanocomposite-based core-shell compositions to store gas molecules inside these compositions. The container is equipped with means for releasing the gas molecules.

Still another embodiment of the present invention is a low power-consumption method for releasing the hydrogen from the shell-core compositions inside a container at a controlled rate. Light of specific wavelength ranges (e.g., infrared, IR) may be used to heat up the micro-spheres to release the hydrogen. The IR light intensity may be adjusted to control the hydrogen flow rate. Alternatively, a heater or a hot air blower may be used to heat the micro-spheres to reach a temperature withing the range of (Tg−20 degrees) and (Tg+20 degrees), but preferably in the range of (Tg−10 degrees) and (Tg+10 degrees), where Tg is the glass transition temperature or a softening point of a shell matrix resin or core material. A Tg no greater than 150° C. is preferred. A hydrogen-based combustion engine can also draw the needed hydrogen fuel from the presently invented system. Optionally, a rechargeable battery may be used to help initiate the operation of the fuel cell by providing an initial amount of the heat to help release the hydrogen. This battery can be readily recharged once the fuel cell is in full operation.

The invention claimed is:

1. A core-shell composition for gas storage, comprising a hollow or porous core and a shell comprising a nanocomposite; said nanocomposite comprising an exfoliated layered filler dispersed in a matrix material and said shell having a thickness smaller than 50% of a radius of said core-shell composition.

2. The core-shell composition as defined in claim 1, wherein said layered filler comprises a platelet having a dimension smaller than 200 nanometers and an aspect ratio greater than 25.

3. The core-shell composition as defined in claim 1, wherein said layered filler comprises a platelet having a thickness smaller than 200 nanometers and both length-to-thickness and width-to-thickness ratios or diameter-to-thickness ratio greater than 25.

4. The core-shell composition as defined in claim 1, wherein said layered filler comprises a platelet having a thickness smaller than 100 nanometers and both length-to-thickness and width-to-thickness ratios or diameter-to-thickness ratio greater than 50.

5. The core-shell composition as defined in claim 1, wherein said filler comprises an exfoliated graphite or an exfoliated clay or silicate structure.

6. The core-shell composition as defined in claim 1, wherein said nanocomposite has a tensile or flexural strength greater than 10,000 psi or 689.5 MPa.

7. The core-shell composition as defined in claim 1, wherein said nanocomposite has a tensile or flexural strength greater than 50,000 psi or 3.45 GPa.

8. The core-shell composition as defined in claim 1, wherein said filler is selected from the group consisting of bentonite, vermiculite, montmorillonite, nontronite, beidellite, volkonskoite, hectorite, saponite, laponite, sauconite, magadiite, kenyaite, ledikite and mixtures and solutions thereof.

9. The core-shell composition as defined in claim 1, wherein said filler comprises a nano-scaled graphene plate.

10. The core-shell composition as defined in claim 1, wherein said nanocomposite comprises a volume fraction of said filler in the range of 0.1% to 30%.

11. The core-shell composition as defined in claim 1, wherein said core comprises a supporting shell or wall material selected from the group consisting of a polymer, ceramic, glass, carbon, composite, and combinations thereof.

12. The core-shell composition as defined in claim 1, wherein said porous core comprises micrometer- or nanometer-scaled pores.

13. The core-shell composition as defined in claim 1, wherein said porous core comprises a plurality of cavities selected from the group consisting of shell-hollow core micro-spheres, shell-porous core micro-spheres, and combinations thereof.

14. The core-shell composition as defined in claim 1, wherein said composition has a dimension smaller than 100 μm.

15. The core-shell composition as defined in claim 1, wherein said composition has a dimension smaller than 5 μm.

16. The core-shell composition as defined in claim 1, wherein said layered filler comprising nano-scaled platelets is bi-axially orientated in said shell.

17. A normally closed container that contains therein a plurality of nanocomposite shell-core compositions as defined in claim 1 to store gas molecules inside said compositions, said container being equipped with means for releasing said gas molecules.

18. A hydrogen gas storage and supply method, comprising:
(a) providing a plurality of nanocomposite based shell-core compositions as defined in claim 1, said compositions being pre-filled with pressurized hydrogen gas and enclosed in a container, wherein said compositions comprise a polymer having a glass transition temperature or softening temperature, Tg, no greater than 300 degrees Celsius; and
(b) heating said shell-core compositions to a temperature within Tg±20 degrees, or sufficient to cause diffusion of hydrogen outside said compositions to provide hydrogen fuel from said container to a hydrogen-consuming device.

19. The hydrogen storage and supply method as defined in claim 18, wherein said Tg is no greater than 150° C.

20. The hydrogen storage and supply method as defined in claim 18, wherein said hydrogen-consuming device comprises a fuel cell.

21. The hydrogen storage and supply method as defined in claim 20, further including a step of utilizing a portion of the heat generated by said fuel cell to help the heating of said compositions.

22. The hydrogen storage and supply method as defined in claim 20, further comprising a step of using a rechargeable battery to provide an initial amount of heat to said compositions to help initiate an operation of said fuel cell.

23. The hydrogen storage and supply method as defined in claim 18, wherein said container contains an initial amount of hydrogen inside said container but outside said shell-core compositions.

24. The hydrogen storage and supply method as defined in claim 23, further comprising a step of using a portion of said initial amount of hydrogen to initiate an operation of said hydrogen-consuming device.

* * * * *